(12) United States Patent
Sokoll

(10) Patent No.: US 7,845,739 B2
(45) Date of Patent: Dec. 7, 2010

(54) BRAKE REGULATION SYSTEM FOR MOTOR VEHICLES

(75) Inventor: Guenther Sokoll, Olching (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 12/558,957

(22) Filed: Sep. 14, 2009

(65) Prior Publication Data

US 2010/0004095 A1    Jan. 7, 2010

Related U.S. Application Data

(63) Continuation of application No. PCT/EP2008/002325, filed on Mar. 22, 2008.

(30) Foreign Application Priority Data

Apr. 2, 2007    (DE) .................. 10 2007 015 889

(51) Int. Cl.
B60T 8/32    (2006.01)
(52) U.S. Cl. .................. 303/149; 303/192
(58) Field of Classification Search ............... 303/139, 303/149, 191, 192; 701/73, 80–82
See application file for complete search history.

(56) References Cited

U.S. PATENT DOCUMENTS

| | | | |
|---|---|---|---|
| 6,041,276 A | 3/2000 | John et al. | |
| 6,439,675 B1 | 8/2002 | Zechmann et al. | |
| 6,814,414 B1 | 11/2004 | Schmitt et al. | |
| 7,338,137 B2 * | 3/2008 | Kinder et al. | 303/191 |
| 7,434,896 B2 * | 10/2008 | Sauter | 303/149 |
| 2003/0214181 A1 * | 11/2003 | Polzin | 303/142 |

FOREIGN PATENT DOCUMENTS

| | | |
|---|---|---|
| DE | 196 53 855 C1 | 4/1998 |
| DE | 199 41 482 A1 | 4/2000 |
| DE | 199 50 034 A1 | 4/2001 |
| DE | 102 00 783 A1 | 7/2003 |
| DE | 103 05 298 A1 | 8/2004 |
| DE | 10 2004 060 255 A1 | 7/2005 |

(Continued)

OTHER PUBLICATIONS

German Search Report dated Feb. 22, 2008 with English translation (nine (9) pages).

(Continued)

*Primary Examiner*—Christopher P Schwartz
(74) *Attorney, Agent, or Firm*—Crowell & Moring LLP

(57) ABSTRACT

A brake regulation system for motor vehicles is provided with an electronic control unit, by which an automatic parking brake function can be activated in the stationary phase of the motor vehicle and can be deactivated upon reaching a predetermined triggering condition. The control unit can determine in a wheel selective manner the coefficient of friction, or rather the adhesion between the tires and the roadway at the location of the motor vehicle, which is held so as to be stationary by use of the parking brake function. In the presence of different coefficients of friction or adhesion coefficients at the right and left wheel of at least one driven axle, the triggering condition is adapted in the direction of a longer hold of the brake pressure.

6 Claims, 1 Drawing Sheet

FOREIGN PATENT DOCUMENTS

| | | |
|---|---|---|
| DE | 10 2005 023 876 A1 | 1/2006 |
| DE | 10 2005 015 062 A1 | 2/2006 |
| DE | 10 2006 021 652 A1 | 11/2006 |
| DE | 10 2006 026 626 A1 | 12/2007 |
| WO | WO 2007/140996 A1 | 12/2007 |

OTHER PUBLICATIONS

International Search Report dated Jul. 7, 2008 with English translation (four (4) pages).

* cited by examiner

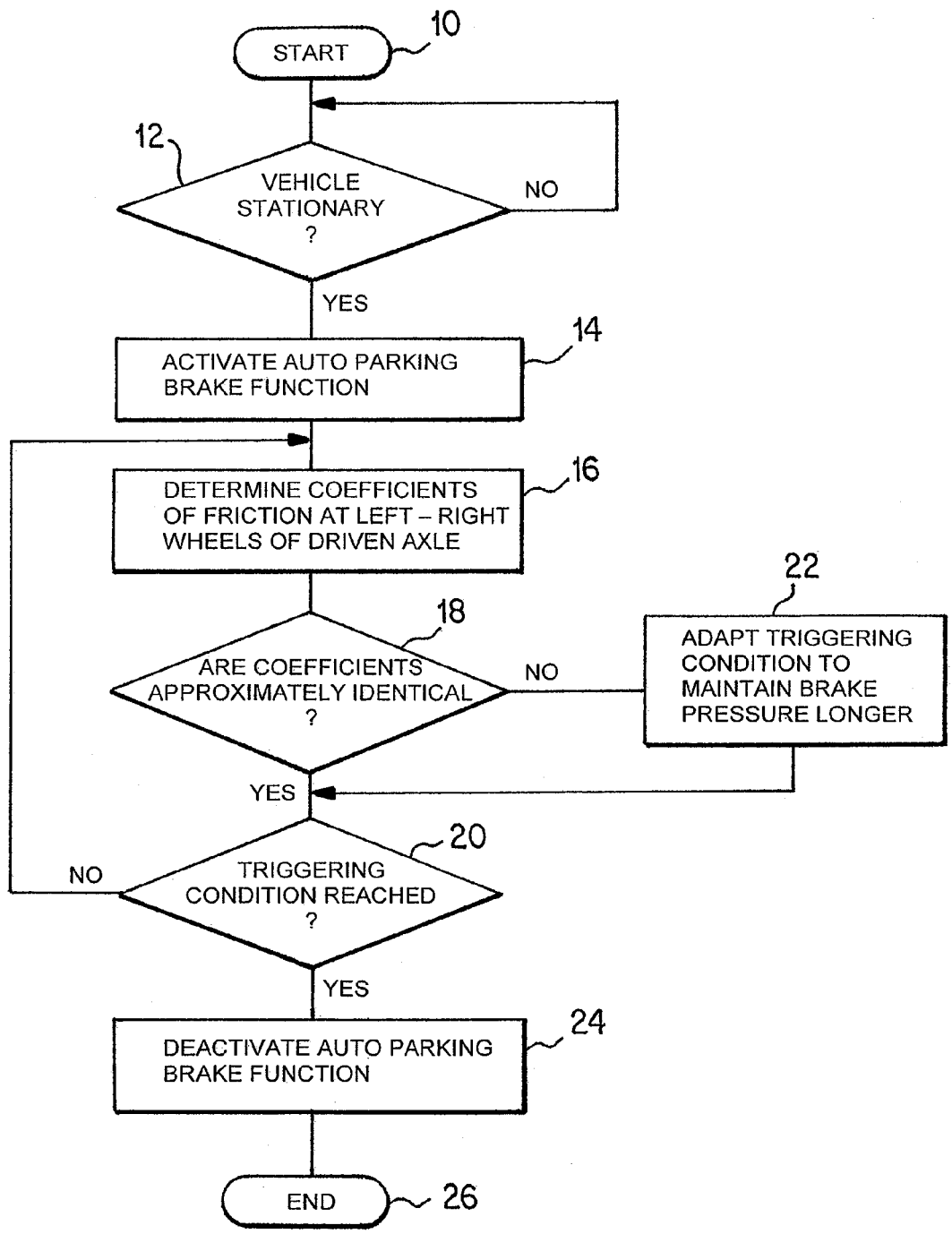

BRAKE REGULATION SYSTEM FOR MOTOR VEHICLES

CROSS-REFERENCE TO RELATED APPLICATIONS

This application is a continuation of PCT International Application No. PCT/EP2008/002325, filed Mar. 22, 2008, which claims priority under 35 U.S.C. §119 to German Patent Application No. DE 10 2007 015 889.2, filed Apr. 2, 2007, the entire disclosures of which are herein expressly incorporated by reference.

BACKGROUND AND SUMMARY OF THE INVENTION

The invention relates to a brake regulation system for motor vehicles with an electronic control unit, by which an automatic parking brake function can be activated when the motor vehicle is stationary and can be deactivated upon reaching a predetermined triggering condition.

Various adequate methods and devices intended for preventing vehicles from rolling away are known in particular, but not necessarily for use on slopes. In at least one operating mode in the case of an activated brake pedal or through an additional activation element, the brake force is usually held or actively built up at least at one wheel of a vehicle as a function, or independently of, the degree to which the brake pedal or another activation element is activated. At the same time, in order to activate and/or deactivate the function, different occurrence conditions and/or triggering conditions are provided jointly or alternatingly.

These methods and/or devices are known, for example, under the names "start-up assist" function, "hill assist" function, "hill hold" function, or "automatic hold" function. In summary, these methods are referred to below as an automatic parking brake function. The common feature of all of these automatic parking brake functions is, for example, a hydraulic, mechanical electrohydraulic, electromechanical or pneumatic, electronically controllable brake system, by which the holding of the vehicle and the prevention of the vehicle from starting to roll is accomplished. There also exist methods, in which the vehicle is prevented from starting to roll by means of the transmission (in particular, an automatic transmission). In all of the functions, the function is activated, for example, by activating the brake pedal or the hand brake, or by means of switching elements that are connected to said brake, and/or even other activation elements (for example, switches, push buttons, and the like). A deactivation of the function occurs by means of the same or also other auxiliary means (such as acceleration pedal position, coupling signal, drive torque signals of the engine or the like, and/or also following the expiration of a defined holding period).

Other important and necessary auxiliary measures, control signals or switching means for representing the functions are, for example, usually one or more speed signals for detecting the stationary phase of the vehicle; mechanical, pneumatic or hydraulic actuators (just as possible are, in principle, also electro-hydraulic, electro-pneumatic or electric actuators) in the wheel brakes, in particular in the feed lines to the wheel brakes, by which the braking effect can be increased, decreased, and/or can be held temporarily (for example, the control/regulating valves integrated in the form of an existing control or regulating device, for example ABS, ASC/ASR, DSC/ESP/EHB system). Optionally, longitudinal acceleration or inclination sensors are also provided, by which the roadway longitudinal inclination is determined, and from which the necessary braking power for a guaranteed immobilization of the vehicle and the start-up torque, which is necessary for the roadway inclination, can be determined. One or more pressure sensors may be provided, by which the brake pressure, in particular the generated brake torque, at the wheel brake(s) can be determined.

According to DE 10 2006 026 626, in the presence of a triggering condition, the brake pressure, which was built-up for the parking brake function at least at one driven wheel where a coefficient of friction below a predetermined threshold was determined, is converted into a brake pressure that is necessary for preventing a roll away on longitudinally inclined roadways or which is necessary for reaching a start-up, in particular through transfer into the anti-slip control at a very low coefficient of friction.

The term "brake pressure" shall also be defined as any analogous or generalizing variable indicative of brake pressure, such as the brake torque, which can be made effective by decelerating a wheel, for example, with electric, hydraulic and/or electrohydraulic means.

The object of the invention is to provide an improved brake regulation system, in particular for handling the transition from a parking brake function into a start-up process.

The invention achieves this object by providing a brake regulation system with an electronic control unit, by which an automatic parking brake function can be activated when the motor vehicle is stationary and can be deactivated upon reaching a predetermined triggering condition. The control unit can determine in a wheel selective manner the coefficient of friction of the roadway at the location of the motor vehicle, which is held so as to be stationary by way of the parking brake function. In the presence of different coefficients of friction at the right and left wheels of at least one driven axle, the triggering condition is adapted in the direction of a longer hold of the brake pressure. Advantageous further developments of the invention are described herein.

In the inventive brake regulation system for motor vehicles with an electronic control unit, by which an automatic parking brake function can be activated in the stationary phase of the motor vehicle, the automatic parking brake function can usually be deactivated upon reaching a predetermined triggering condition (for example, detection of a start-up request). The control unit, which can receive both sensor signals and data through the databus connections to other control units as input signals, can determine in a wheel selective manner the coefficient of friction (that is, the effective adhesion) between the tires and the roadway at the location of the motor vehicle, which is held in the stationary mode by the parking brake function. In so doing, the coefficient of friction (or an amount which is directly or indirectly proportional to the coefficient of friction) can be measured, calculated, estimated or sensed directly or indirectly.

According to an aspect of the invention, in the presence of different coefficients of friction at the right and left wheels of at least one driven axle, the triggering condition is adapted in the direction of a longer hold of the brake pressure.

Other objects, advantages and novel features of the present invention will become apparent from the following detailed description of one or more preferred embodiments when considered in conjunction with the accompanying drawings.

BRIEF DESCRIPTION OF THE DRAWING

The FIGURE illustrates a flow chart of an exemplary method of operating the brake regulation system for a motor vehicle according to the invention.

DETAILED DESCRIPTION OF THE DRAWING

Referring to the FIGURE, there is shown a flow chart of an exemplary embodiment for the method and brake regulation system. After starting (10), it is determined whether the vehicle is stationary (12). If the vehicle is stationary, then the automatic parking brake function may be activated (14). An electronic control unit that activates the automatic parking brake function can determine in a wheel selective manner the coefficient of friction of a roadway at the location of the motor vehicle that is stationary (16). The method checks whether the coefficients of friction at the left and right wheels of at least one driven axle of the motor vehicle are identical or differ from one another (18). When the coefficients of friction are approximately identical, the method proceeds to determine whether a triggering condition for deactivating the automatic parking brake function has been reached (20). If not, then the method continues to monitor the coefficients of friction and looks for whether the predetermined triggering condition has been reached. If, however, the coefficients of friction differ at the right and left wheels of at least one driven axle, then the triggering condition is adapted to maintain a brake pressure for a longer period of time (22). Thereafter, if the adapted triggering condition has been reached (20), then the automatic parking brake function would be deactivated (24) and the method ends (26).

This adaptation of the triggering condition considers the so-called µ split situation. That is, the driven wheel of one side of the vehicle is situated on a roadway having a high coefficient of friction, and the driven wheel of the other side of the vehicle is situated on a roadway having a low coefficient of friction (for example, the gravel on the shoulder of the roadway, patch of ice, etc.) or vice versa.

The invention is also based on an additional recognition. The German patent application DE 10 2006 026 626, which is commonly assigned and was not pre-published, describes basically an improved transition function for the brake torque, in particular or rather the brake pressure, during the transition from the parking brake function to the next subsequent anti-slip control process. The present invention supplements this method by considering the start-up condition or rather the triggering condition—thus, the condition that is necessary for triggering the parking brake function (hill holder function/start-up assist function).

One must bear in mind that under the coefficient of friction conditions that are considered here (that is, µ split or, in particular, usually different coefficient of friction (rather adhesion) ratios, at least at the drive wheels) on roadway slopes, it is possible to significantly improve the function through adaptation of the triggering condition for the parking brake function.

During start-up in response to at least almost homogeneous coefficient of friction ratios, the brake pressure, that is the brake torque, is usually released no earlier than when a specified (drive) torque threshold is exceeded in the event of a start-up request. This threshold can be, for example, a well defined torque threshold. In a further development of the embodiment, however, this torque threshold can also be, for example, a function of the roadway inclination. In addition, the torque threshold can also be a function of the mass of the vehicle (for example, the vehicle load, trailer load) or a function of the intensity of the start-up request (for example, the accelerator pedal gradient).

Under the premise of the split—thus, different—coefficient of friction ratios at least at the drive wheels, the aforementioned well defined or calculated torque threshold (to be applied to the vehicle) is no longer adequately exact. As a result, during the start-up process, the brake torque may be released too early and, hence, the vehicle may start to roll back until the driver's input is adequately increased by activating the accelerator pedal.

Therefore, according to the invention, upon detection of a µ split situation (detection, for example, during deceleration into the stationary phase by way of µ slip and/or adhesion evaluation, or by way of the anti-slip control occurring just before the vehicle comes to a standstill), the torque threshold is correspondingly raised so that the brake torque is not released until a higher drive torque has been reached.

Therefore, in the theoretical case of a µ split situation with a coefficient of friction close to zero at one wheel of at least one driven axle, the torque threshold that applies to the homogenous coefficient of friction ought to be doubled, because the adhesion can be transferred to only one drive wheel, instead of two wheels during standard drive (that is, in the case of only one driven axle). Correspondingly, in one improved embodiment the torque threshold can be raised continuously or at least in a stepped manner as a function of the previously detected, estimated or calculated adhesion ratios or coefficient of friction ratios. This measure can be implemented, for example, as an additive or multiplicative offset, starting from the torque threshold that is applicable to homogeneous ratios.

The invention makes it possible to improve, in particular, the ease and convenience of the function, the quality of the function, and the drive performance, as well as to achieve an optimal system transition from the parking brake function (for example, hill hold) for the anti-slip control (ASC).

A prerequisite for improving the system transition is the preferably wheel selective detection of a roadway which has a low coefficient of friction and on which the vehicle, that is its wheels, are located at the time immediately before the start-up situation (condition 1). Preferably, a longitudinally inclined roadway (roadway inclination in the driving direction—that is, with a corresponding request for the direction of travel) should also be determined, if possible, so as to obtain exact information about the degree of the roadway inclination (condition 2), in order to be able to better estimate the effects of the low coefficient of friction.

Possibilities for determining the presence of condition 1 or 2 are also cited, for example, in DE 10 2006 026 626, the entire content of which is incorporated by reference herein.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A brake regulation system for a motor vehicle, comprising:
an electronic control unit, by which an automatic parking brake function is activatable when the motor vehicle is stationary and deactivatable upon reaching a predetermined triggering condition;
wherein the electronic control unit determines in a wheel selective manner a coefficient of friction of a roadway at a location of the motor vehicle being held stationary via the automatic parking brake function;
wherein when different coefficients of friction exist at right and left wheels of at least one driven axle of the motor vehicle, the predetermined triggering condition for deactivating the automatic parking brake function is adapted so that brake pressure is maintained for a longer period of time; and wherein the triggering condition is an overshooting of a defined drive torque threshold, said drive torque threshold being doubled in the presence of a coefficient of friction of substantially zero on one side in relation to a drive torque threshold in the case of approximately identical coefficients of friction at the left and the right wheels of the at least one driven axle.

2. The brake regulation system according to claim 1, wherein the triggering condition is an overshooting of a defined drive torque threshold, said drive torque threshold being raised in the presence of different coefficients of friction in relation to a drive torque threshold for approximately identical coefficients of friction at the left and right wheels of the at least one driven axle.

3. The brake regulation system according to claim 2, wherein the triggering condition is an overshooting of a defined drive torque threshold, said drive torque threshold being raised in one of a stepped and continuous manner as a difference between the coefficients of friction at the left and the right wheels of the at least one driven axle increases.

4. The brake regulation system according to claim 1, wherein the triggering condition is an overshooting of a defined drive torque threshold, said drive torque threshold being raised in one of a stepped and continuous manner as a difference between the coefficients of friction at the left and the right wheels of the at least one driven axle increases.

5. A method for operating a brake system of a motor vehicle having an electronic control unit for an automatic parking brake function, the method comprising the acts of:

activating the automatic parking brake function when the motor vehicle is stationary;

determining in a wheel selective manner a coefficient of friction of a roadway at a location in which the motor vehicle is held stationary via the automatic parking brake function; and deactivating the automatic parking brake function upon reaching a predetermined triggering condition, said triggering condition being adapted to maintain brake pressure for a longer period of time when different coefficients of friction exist at right and left wheels of at least one driven axle of the motor vehicle;

wherein the raising of the drive torque threshold comprises a doubling of the drive torque threshold when a coefficient of friction on one side of the at least one driven axle is substantially zero in relation to the drive torque threshold when approximately identical coefficients of friction exist at the left and right wheels of the at least one driven axle.

6. The method according to claim 5, wherein the triggering condition is an overshooting of a defined drive torque threshold, the method further comprising adapting the triggering condition by raising the drive torque threshold when different coefficients of friction exist in relation to the drive torque threshold when approximately identical coefficients of friction exist.

\* \* \* \* \*